March 1, 1960 H. D. CRANE 2,927,220
EXCLUSIVE OR FUNCTION MAGNETIC CIRCUIT
Filed June 12, 1958

INVENTOR
HEWITT D. CRANE
BY
Christie, Parker & Hale
ATTORNEYS 2,927,220
Patented Mar. 1, 1960

2,927,220

EXCLUSIVE OR FUNCTION MAGNETIC CIRCUIT

Hewitt D. Crane, Palo Alto, Calif., assignor to Burroughs Corporation, Detroit, Mich., a corporation of Michigan Application June 12, 1958, Serial No. 741,692

10 Claims. (Cl. 307—88)

This invention relates to magnetic core circuits for performing binary logic functions, and more particularly is concerned with a circuit for performing an "exclusive or" function.

In copending application Serial No. 698,633 filed November 25, 1957 in the name of Hewitt D. Crane and assigned to the assignee of the present invention, there is described a core register having a novel transfer circuit requiring no diodes or other impedance elements in the transfer loops between cores. The basic binary storage element of this circuit is an annular core having small input and output apertures. The binary zero digit is stored in the form of flux oriented in the same direction in the core on either side of the respective apertures, while the binary one digit is stored in the form of flux extending in opposite directions on either side of the respective apertures. Transfer is effected by applying a current pulse of predetermined magnitude to a coupling loop linking one aperture in each of two cores, one core constituting a transmitting core and the other core constituting a receiving core. Each core element acts as a binary storage device and the binary information stored may be shifted from core to core as required.

In copending application Serial No. 703,003 filed December 16, 1957 in the name of Hewitt D. Crane and assigned to the assignee of the present invention, there is described a core element which may be used in the above-described register to convert a binary one into a binary zero, or vice versa, in the process of storage and transfer. In contrast to the storage element for straight transfer, as described briefly above, such a negating core element stores flux patterns around the input aperture and the output aperture which respectively represent different binary digits and not the same binary digits. The core element used for the negation circuit is quite different in shape from the simple annular core element used in the straight transfer type of core circuit and is characterized by the fact that it has an additional shunting flux path in which flux is normally held in one direction by an applied D.C. bias current.

The present invention utilizes the principles of the above-identified copending applications, providing a circuit which performs the "exclusive or" function. Thus the present invention provides a circuit which, according to positive logic, produces a binary one at the output only when one or the other of two inputs exclusively has received a binary one. The "exclusive or" function may be expressed in Boolian algebra form as $z=x\bar{y}+\bar{x}y$.

In brief, the circuit of the present invention comprises a pair of negating core elements to which the respective $x$ and $y$ inputs are applied, and a single straight transfer core element from which the output $z$ is derived. The transfer circuit coupling the two negating core elements to the output core element includes two series-connected windings which respectively link output apertures in the negating core element, the output apertures having a flux condition which always represents the opposite binary digit from the two inputs. The transfer circuit also includes two windings connected in series which link output apertures in the negating core elements, the latter output apertures always having a flux condition representing the same binary digit as the input. These two sets of series-connected windings are connected in shunt with each other and in shunt with a winding linking the input aperture of the output core element. By applying a current pulse of predetermined magnitude to the transfer circuit for pulsing a current through each of the three parallel connected sets of windings, a binary one flux condition is transferred to the output core element only if one or the other of the negating core elements exclusively has a binary one flux condition applied to the input thereof.

For a more complete understanding of the invention, reference should be had to the accompanying drawings, wherein.

Figure 1:
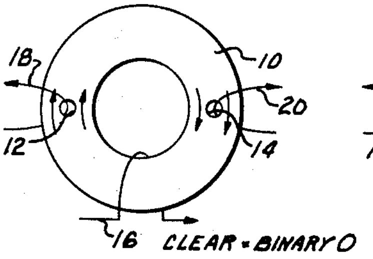
Figs. 1 and 2 show a ferrite magnetic core element such as used in the present invention in two conditions of flux orientation, the core element being of the type providing a straight transfer function.
Figure 2:
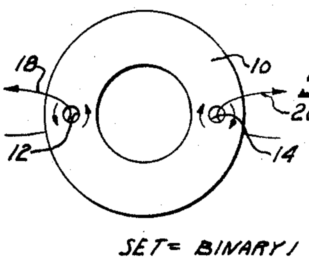

Consider an annular core, such as indicated at 10 in Figs. 1 and 2, made of a magnetic material such as ferrite, having a square hysteresis loop characteristic, i.e., a material having a high flux retentivity or remanence. The annular core is preferably provided with two small apertures 12 and 14, each of which divides the annular core into two parallel flux paths as indicated by the arrows. If a large current is pulsed through the central opening of the core 10, as by a clearing winding 16, the flux in the core may be saturated in a clockwise direction. The core is then said to be in a cleared or binary zero condition. If a current is passed through either of the apertures 12 or 14, as by either of the windings 18 or 20 in the direction indicated in Fig. 2, and the current is of sufficient magnitude to cause switching of flux around the central opening of the annular core, a portion of the flux can be reversed so that the flux extends in opposite directions on either side of the respective apertures 12 and 14, as indicated by the arrows in Fig. 2. The core is then said to be in the set or binary one state.

The significant aspect of the transfer circuit using the core elements of Figs. 1 and 2, as described in detail in application Serial No. 698,633 mentioned above, is that with a given number of turns linking one of the small apertures in the core and with the core in its cleared state as shown in Fig. 1, a current exceeding a threshold $I_t$ must be provided to change the core to its set state, as shown in Fig. 2. If the current does not exceed this threshold level, substantially no flux is switched around the core. The aperture is said to be "blocked" when the current passing through the aperture must exceed the threshold $I_t$ in order to switch any flux in the core element. On the other hand, if the core element is already in its set state, a very small current, substantially less than the threshold value $I_t$, causes flux to switch locally about the aperture. In this case the aperture is said to be "unblocked." Thus if a current slightly less than the threshold current $I_t$ is passed through an aperture in the core element, flux is switched or not switched within the core depending upon whether the core is in its cleared state or its set state, i.e., depending upon whether the aperture is blocked or unblocked.

To provide a negation function, a core circuit must be arranged such that the input aperture is blocked and the output aperture is unblocked, corresponding to the flux condition of the input aperture in Fig. 1 and the flux condition of the output aperture in Fig. 2, when in the cleared condition. This is accomplished by the core element and associated circuit of Figs. 3 and 4.

Figure 3:
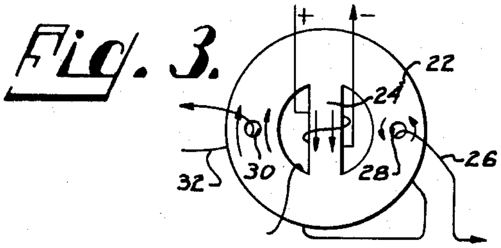
Figs. 3 and 4 show a ferrite magnetic core element such as used in the present invention in two conditions of flux orientation, the core element being of the type providing a negation function.
Figure 4:
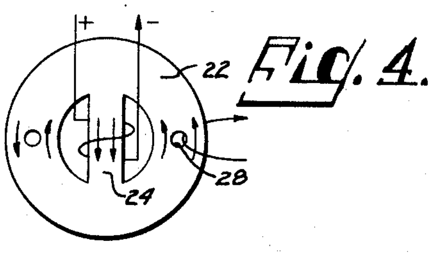

A negating core element 22 is provided with a central leg 24 having a hold winding thereon for maintaining the flux in one direction in the central leg. The clear winding 26 not only links the core but links the output aperture 28. Thus when the negating core element 22 is cleared, the input aperture 30 is cleared with the flux being in the same direction on either side of the input aperture, and the output aperture is unblocked with the flux being in opposite directions on either side of the output aperture. Only if a current exceeding the threshold level $I_t$ is applied to an input winding 32 linking the input aperture 30 can flux be switched at the output aperture 28. As a result the output aperture becomes blocked. It will thus be seen that the negating core element of Figs. 2 and 3 provides the opposite output condition from the straight transfer core element of Figs. 1 and 2.

Figures 5, 5A, 6:
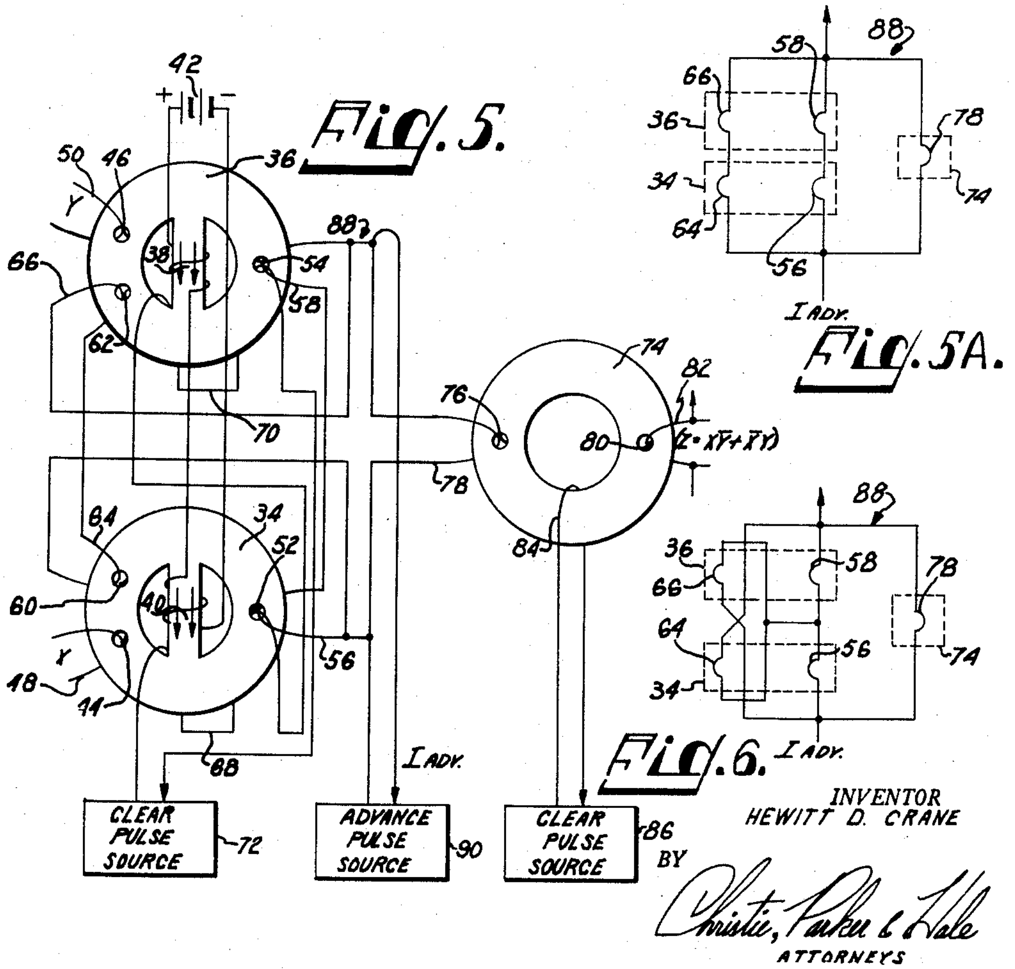
Figs. 5 and 5A show a circuit according to the present invention for providing an "exclusive or" function using core elements of the type shown in Figs. 1–4.
Fig. 6 shows an alternative arrangement of the same core circuit.

According to the present invention, core element operating according to the principles briefly described above in connection with Figs. 1 to 4 may be used to provide a circuit for accomplishing an "exclusive or" function. This circuit is shown in Fig. 5 and comprises a pair of input negating core elements 34 and 36, and as described above in connection with Figs. 3 and 4, the negating core elements are substantially annular in shape and provided with central legs on which are wound hold windings 38 and 40 connected in series across a D.C. source such as a battery 42. The negating core elements 34 and 36 are respectively provided with input apertures 44 and 46 which are linked by respective input windings 48 and 50.

The core elements 34 and 36 are also provided with negating output apertures 52 and 54 which are respectively linked by windings 56 and 58.

The core elements 34 and 36 are also provided with straight output apertures 60 and 62 respectively linked by windings 64 and 66. The output apertures 60 and 62, by being located on the same side of the core element as the input apertures 44 and 46, function the same as the output apertures in a straight core element of the type described above in connection with Figs. 1 and 2. This concept is described in more detail in the above-mentioned copending application Serial No. 703,003.

Each of the negating core elements 34 and 36 is provided with a clearing winding, such as indicated at 68 and 70. The two clearing windings are connected in series to a clear pulse source 72 by means of which a large current may be pulsed through the clearing windings to orient the flux in the respective core elements to the cleared condition, as described above in connection with Fig. 3. As shown, the clearing windings 68 and 70 include turns which link the annular portion of the respective negating core elements to the left of the central legs, and include turns which link the output apertures 52 and 54.

The "exclusive or" circuit of Fig. 5 further includes a core element 74 of the straight transfer type described above in connection with Figs. 1 and 2. The core element 74 includes an input aperture 76 which is linked by an input winding 78. The core element 74 also includes an output aperture 80 linked by an output winding 82. The clear winding 84 is wound on the annular core element 74 and is pulsed from a clear pulse source 86 by means of which the flux may be cleared to the binary zero condition shown in Fig. 1.

A transfer loop, indicated generally at 88, couples the negating core elements 34 and 36 to the core element 74. The connection of the windings linking the output apertures of the negating core elements and the input aperture of the core element 74 is shown schematically in Fig. 5A. As is apparent from the schematic diagram of Fig. 5A, the windings 64 and 66 are connected in series, as are the windings 56 and 58 associated with the several output apertures of the negating core elements 34 and 36. These two groups of series-connected windings are connected in shunt with each other and in shunt with the input winding 78 of the core element 74, forming three parallel current conductive branches. An advance current $I_{Adv}$, derived from an advance pulse source 90, divides between the three parallel branches of the transfer loop 88 according to the respective impedances of the windings of each branch.

Considering the operation of the "exclusive or" circuit of Fig. 5, it should be kept in mind that the impedance of a winding linking an aperture in a core element depends upon the flux condition of the core element in the vicinity of the aperture. Referring back to Figs. 1 and 2, if the output aperture 14 is blocked, and a current is passed through the winding 20 which is below the threshold level required to switch flux around the annular core, impedance to the flow of current will be relatively low since no flux can be switched in the core element. However, if the output aperture is unblocked, as shown in Fig. 2, the impedance to the same flow of current will be much greater because of the switching of flux in a relatively short closed path around the output aperture. The switching of flux, by Lenz's law, generates a counter E.M.F. which opposes the flow of current through the winding.

Keeping this principle in mind and referring again to the circuit of Figs. 5 and 5A, consider first the operation with both the negating core elements 34 and 36 in their cleared condition. This means that the output apertures 52 and 54 are unblocked, corresponding to the binary one flux condition, while the output apertures 60 and 62 are blocked, corresponding to the binary zero flux condition. With the core element 74 in its cleared condition, the input aperture 76 is in effect blocked. This means that the current path for the advance current through the windings 64 and 66 provides a relatively low impedance current path, as does the parallel branch including the winding 78. However, the current branch including the windings 56 and 58 in series, provides a relatively high impedance. The level of the current $I_{Adv}$ is set in accordance with the level of the impedance of the several parallel current conductive paths such that the current level in the winding 78, under the conditions described above, is below the threshold level $I_t$ required to switch flux around the annular core element 74. Therefore the application of an advance current pulse to the transfer loop 88 with a binary zero condition at the $x$ and $y$ inputs leaves the output $z$ in the binary zero condition.

Similarly, if an input pulse is applied to both the inputs $x$ and $y$ so as to switch flux in the negating core elements 34 and 36, the application of an advance current pulse will not switch any flux in the core element 74. Now the apertures 60 and 62 are unblocked so that the windings 64 and 66 present a high impedance current path while the apertures 52 and 54 are unblocked so that the windings 56 and 58 present a low impedance path. Therefore if $x$ and $y$ are both zero, or if $x$ and $y$ are both 1, in either case the core element 74 remains in the binary zero condition since in both cases the winding 78 is shunted by a low impedance current conductive path which holds the current level in the winding 78 below the threshold required to switch flux in the output core element 74.

However, if a binary one is read in at either the $x$ input or the $y$ input, as by means of a current exceeding the threshold $I_t$ being pulsed through one of the input windings 48 and 50, a different impedance condition exists in the transfer loop 88. One or the other of the output apertures 52 and 54 is now unblocked, depending upon whether $x$ or $y$ is a binary one, and similarly one or the other of the output apertures 60 and 62 is now unblocked. This means that one or the other of the series windings 56 and 58 presents a relatively high impedance to current flow, and also one or the other of the windings 64 and 66 presents a relatively high impedance to current flow. As a result, most of the advance current $I_{Adv}$ is diverted through the winding 78 linking the input aperture 76 to the core element 74. This current level now is above the threshold $I_t$ required to switch flux around the core element 74. As a result the core element 74 is changed to its set condition and the output aperture 80 is unblocked, corresponding to the binary one condition. In other words, if a binary one is read into either the $x$ or $y$ inputs exclusively, a binary one will exist at the output $z$ following the application of an advance current pulse to the transfer loop 38.

Fig. 6 shows an alternative way of interconnecting the windings of the core elements to effect the "exclusive or" function. Here the non-negating winding of one of the negating core elements is connected in parallel with the negating core winding of the other negating core element. It will be apparent that if both negating core elements are in the identical flux condition, no flux will be transferred by the advance current pulse. If they are in opposite flux conditions, the advance current will switch flux in the receiving core element.

From the above description it will be recognized that the circuit of Fig. 5 operates to perform the "exclusive or" function $z=x\bar{y}+\bar{x}y$. The input windings 48 and 50 may be part of the transfer loops linking the output of other core elements and similarly the output winding 82 may be part of a transfer loop linked to the input of another core element. Reading into the inputs $x$ and $y$ can be accomplished simultaneously with reading out of output $z$. This is in conformance with the principles of the core register described in the above-mentioned copending application Serial No. 698,633. While one particular shape of negating core element and one shape straight transfer core element have been described, it will be understood that the shapes of these respective core elements can be modified according to the teaching of the above-mentioned copending application Serial No. 703,003 or the teaching of applications Serial No. 718,883 filed March 3, 1958 and Serial No. 741,691 filed June 12, 1958 in the name of Hewitt D. Crane and assigned to the assignee of the present invention.

What is claimed is:

1. An "exclusive or" circuit comprising a pair of input negating core elements and an output core element, the core elements being made of magnetic material having high flux remanence, the negating core elements each having an input aperture and a pair of output apertures and the output core element having an input aperture and an output aperture, means including windings wound on the negating core elements and linking one of each of the pairs of output apertures thereof for initially saturating the flux in the same direction on diametrically opposite sides of the input apertures of the respective negating core elements and in opposite directions on diametrically opposite sides of the said one of each of the pairs of output apertures of the negating core elements, means including a winding wound on the output core element for initially saturating the flux in the same direction on diametrically opposite sides of both the input and output apertures thereof, a transfer circuit including series connected windings linking said one of each of the pair of output apertures in the negating core elements, series connected windings linking the other output apertures of the negating core elements, and an input winding linking the input aperture of the output core element, said input winding being connected in shunt with the two sets of series connected windings to form three parallel current paths in the transfer circuit, and a constant current source coupled to the transfer circuit for passing a current through the three parallel current paths, the current level of said source being below the threshold level required to switch flux in any of the core elements in which the apertures associated with the transfer circuit are blocked when any one of the apertures linked by windings in one of the three parallel current paths is unblocked, the current level being above the threshold required to switch flux in any of the core elements in which the apertures associated with the transfer circuit are blocked when apertures linked by windings in two of the three parallel current paths are unblocked.

2. An "exclusive or" circuit comprising a pair of input negating core elements and an output core element, the core elements being made of magnetic material having high flux remanence, the negating core elements each having an input aperture and a pair of output apertures and the output core element having an input aperture and an output aperture, means including windings wound on the negating core elements and linking one of each of the pairs of output apertures thereof for initially saturating the flux in the same direction on diametrically opposite sides of the input apertures of the respective negating core elements and in opposite directions on diametrically opposite sides of the said one of each of the pairs of output apertures of the negating core elements, means including a winding wound on the output core element for initially saturating the flux in the same direction on diametrically opposite sides of both the input and output apertures thereof, a transfer circuit including series connected windings linking said one of each of the pairs of output apertures in the negating core elements, series connected windings linking the other output apertures of the negating core elements, and an input winding linking the input aperture of the output core element, said input winding being connected in shunt with the two sets of series connected windings to form three parallel current paths in the transfer circuit, and a constant current source coupled to the transfer circuit for passing a current through the three parallel current paths.

3. An "exclusive or" circuit comprising a pair of negating core elements of magnetic material having high flux remanence, each of the negating core elements being shaped to form at least three separate flux-carrying legs, one of the legs having two small apertures and another of the legs having a single small aperture, each of the apertures respectively dividing the associated legs into two parallel flux paths, means responsive to a unidirectional current for setting the flux in opposite direction in the paths formed by each of said single apertures in the negating core elements and for setting the flux in the same direction in the two paths formed by each of said two apertures in the negating core elements, an output core element of magnetic material having a high flux remanence, the output core element being shaped to form at least two separate flux-carrying legs, the legs having small apertures therein dividing respectively each of the legs into two parallel flux paths, means responsive to a unidirectional current for setting the flux in the same direction in the parallel flux paths formed by each of said apertures in the output core element, a transfer circuit including first series connected windings linking each of the negating core elements through one of said two apertures, second series connected windings linking the negating core elements through the respective single apertures, and a third winding linking one of the apertures in the output core element, the three sets of windings being connected in parallel to provide three current paths, and means for pulsing a current through the parallel current paths for transferring information from the negating core elements to the output core element.

4. An "exclusive or" circuit comprising a pair of negating core elements of magnetic material having high flux remanence, each of the negating core elements being shaped to form at least three separate flux-carrying legs, one of the legs having two small apertures and another of the legs having a single small aperture, each of the apertures respectively dividing the associated legs into two parallel flux paths, means responsive to a unidirectional current for setting the flux in opposite direction in the paths formed by each of said single apertures in the negating core elements and for setting the flux in the same direction in the two paths formed by each of said two apertures in the negating core elements, an output core element of magnetic material having a high flux remanence, the output core element being shaped to form at least two separate flux-carrying legs, the legs having small apertures therein dividing respectively each of the legs into two parallel flux paths, means responsive to a unidirectional current for setting the flux in the same direction in the parallel flux paths formed by each of said apertures in the output core element, and a transfer circuit including first series connected windings linking each of the negating core elements through one of said two apertures, second series connected windings linking the negating core elements through the respective single apertures, and a third winding linking one of the apertures in the output core element, the three sets of windings being connected in parallel to provide three current paths.

5. An "exclusive or" circuit comprising a pair of negating core elements of magnetic material having high flux remanence, each of the negating core elements being shaped to form at least three separate flux-carrying legs, one of the legs having two small apertures and another of the legs having a single small aperture, each of the apertures respectively dividing the associated legs into two parallel flux paths, means responsive to a unidirectional current for setting the flux in opposite directions in the paths formed by each of said single apertures in the negating core elements and for setting the flux in the same direction in the two paths formed by each of said two apertures in the negating core elements, and a transfer circuit including first series connected windings linking each of the negating core elements through one of said two apertures, second series connected windings linking the negating core elements through the respective single apertures, and a third winding adapted to link another core element, the three sets of windings being connected in parallel to provide three current paths.

6. An "exclusive or" circuit comprising a pair of multi-apertured negating magnetic core devices for storing binary information in the form of particular flux configurations adjacent the apertures, each negating core device having an input aperture, a negating output aperture, and a non-negating output aperture in the magnetic core thereof, a pair of separate input windings respectively linking the cores of said devices through the input apertures, an output circuit including a pair of windings in series respectively linking the cores of said devices through the negating apertures and a pair of windings in series respectively linking the cores of said non-negating apertures, the two pairs of series windings being connected in parallel with each other to form two current paths, means for pulsing a current through the two parallel current paths, and means for sensing the impedance to said current as determined by the flux condition in the cores adjacent the respective apertures linked by the windings in the two parallel current paths.

7. An "exclusive or" circuit comprising a pair of multi-apertured negating magnetic core devices for storing binary information in the form of particular flux configurations adjacent the apertures, each negating core device having an input aperture, a negating output aperture, and a non-negating output aperture in the magnetic core thereof, a pair of separate input windings respectively linking the cores of said devices through the input apertures, an output circuit including a pair of windings in series respectively linking the cores of said devices through the negating apertures and a pair of windings in series respectively linking the cores of said non-negating apertures, the two pairs of series windings being connected in parallel with each other to form two current paths, and means for pulsing a current through the two parallel current paths.

8. An "exclusive or" circuit comprising a pair of multi-apertured negating magnetic core devices for storing binary information in the form of particular flux configurations adjacent the apertures, each negating core device having an input aperture, a negating output aperture, and a non-negating output aperture in the magnetic core thereof, a pair of separate input windings respectively linking the cores of said devices through the input apertures, and an output circuit including a pair of windings in series respectively linking the cores of said devices through the negating apertures and a pair of windings in series respectively linking the cores of said non-negating apertures, the two pairs of series windings being connected in parallel with each other to form two current paths.

9. Apparatus as defined in claim 8 wherein adjacent windings in each of said series pairs which are connected together at one end at one of the junctions formed by said parallel connections are associated with different ones of said negating core devices.

10. Apparatus as defined in claim 9 wherein the series junction points formed by the series connection of the two windings in each of said parallel current paths are connected together.

References Cited in the file of this patent

UNITED STATES PATENTS

| | | |
|---|---|---|
| 2,729,807 | Paivinen | Jan. 3, 1956 |
| 2,742,632 | Whitely | Apr. 17, 1956 |
| 2,810,901 | Crane | Oct. 22, 1957 |
| 2,869,112 | Hunter | Jan. 13, 1959 |